United States Patent
Pan et al.

(10) Patent No.: US 10,954,125 B2
(45) Date of Patent: Mar. 23, 2021

(54) METHOD OF RECOVERING BROMIDE FROM BROMINE-CONTAINING SMELTING ASH

(71) Applicant: BEIJING UNIVERSITY OF TECHNOLOGY, Beijing (CN)

(72) Inventors: Dean Pan, Beijing (CN); Yufeng Wu, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 4 days.

(21) Appl. No.: 16/485,141

(22) PCT Filed: Jan. 15, 2019

(86) PCT No.: PCT/CN2019/071756
§ 371 (c)(1),
(2) Date: Aug. 9, 2019

(87) PCT Pub. No.: WO2020/057026
PCT Pub. Date: Mar. 26, 2020

(65) Prior Publication Data
US 2020/0392000 A1    Dec. 17, 2020

(30) Foreign Application Priority Data
Sep. 17, 2018   (CN) .......................... 201811083203.6

(51) Int. Cl.
*C01B 9/00* (2006.01)
*C01B 9/04* (2006.01)
(Continued)

(52) U.S. Cl.
CPC .................. *C01B 9/04* (2013.01); *C01G 9/06* (2013.01); *C01G 21/20* (2013.01); *C22B 7/007* (2013.01); *C22B 13/045* (2013.01); *C22B 19/30* (2013.01)

(58) Field of Classification Search
CPC .. C01B 9/04; C01G 9/06; C01G 21/20; C22B 7/006; C22B 7/007; C22B 7/008;
(Continued)

(56) References Cited

U.S. PATENT DOCUMENTS 6,641,712 B1    11/2003 Gibson et al.
2020/0262712 A1* 8/2020 Wu ...................... C22B 3/0017

FOREIGN PATENT DOCUMENTS

CN      103846272 A     6/2014
CN      105177299 A     12/2015
(Continued)

OTHER PUBLICATIONS

The International Search Report of corresponding international application No. PCT/CN2019/071756, dated May 13, 2019.

*Primary Examiner* — Steven J Bos
(74) *Attorney, Agent, or Firm* — J.C. Patents

(57) ABSTRACT

A method of recovering bromide from bromine-containing smelting ash relates to the field of high efficient separation and recovery of bromine by total wet method. It especially relates to the method of high efficiency separation of bromine salt and lead, zinc recovery of circuit board smelting ash by two-step method. It mainly comprising: sub-molten salt leaching, washing, separate Lead and zinc by adjusting the pH of industrial sulfuric acid, membrane separation and concentration, reuse of water, crude bromine salt recovery by evaporation crystallization of bromine salt. Compared with the traditional baking and recycling process of ash, the invention adopts sodium hydroxide submolten salt leaching technology and membrane separation and concentration technology, to reduce the reaction temperature and tailings discharge greatly, which has a good effect of energy saving and emission reduction.

2 Claims, 1 Drawing Sheet

(51) Int. Cl.
   *C01G 9/06* (2006.01)
   *C01G 21/20* (2006.01)
   *C22B 7/00* (2006.01)
   *C22B 3/00* (2006.01)
   *C22B 19/30* (2006.01)

(58) Field of Classification Search
   CPC ........... C22B 7/02; C22B 7/04; C22B 13/045; C22B 19/30; C22B 19/22; C01D 3/10
   See application file for complete search history.

(56) References Cited

FOREIGN PATENT DOCUMENTS

| | | |
|---|---|---|
| CN | 105543486 A | 5/2016 |
| CN | 108118157 A | 6/2018 |
| CN | 109095496 A | 12/2018 |

* cited by examiner

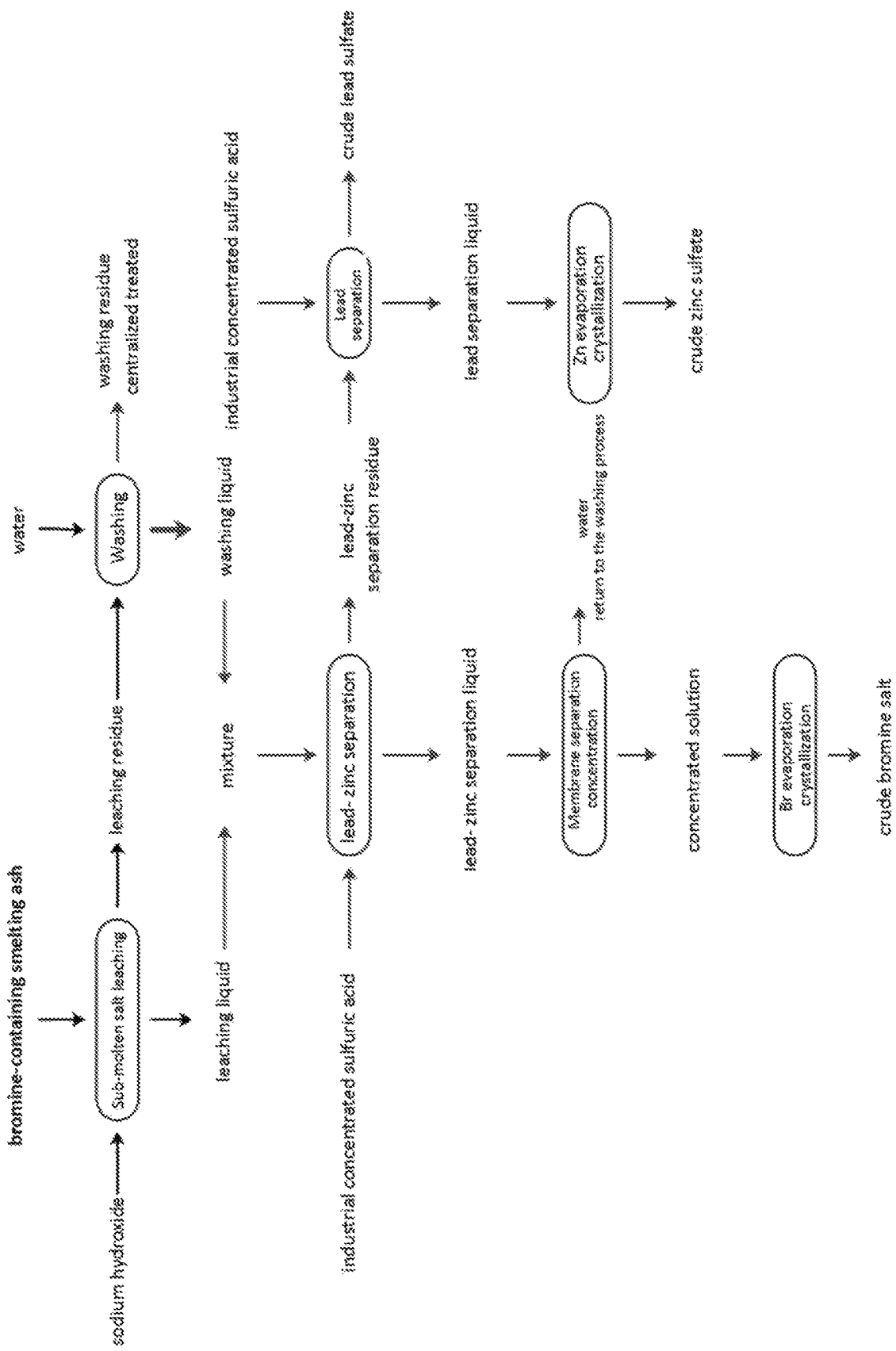

METHOD OF RECOVERING BROMIDE FROM BROMINE-CONTAINING SMELTING ASH

CROSS-REFERENCE TO RELATED APPLICATION

This application is a national phase application of international application No. PCT/CN2019/071756 filed on Jan. 15, 2019, which in turn claims the priority benefits of Chinese application No. 201811083203.6, filed on Sep. 17, 2018. The contents of these prior applications are hereby incorporated by reference in their entirety.

TECHNICAL FIELD

The invention relates to the field of high efficient separation and recovery of bromine by total wet method. It especially relates to the method of high efficiency separation of bromine salt and lead, zinc recovery of circuit board smelting ash by two-step method.

BACKGROUND ART

Recycling and utilization of waste electronic and electrical equipment is a major challenge for mankind. Brominated flame retardants (BFRS) are one of the main chemical flame retardants because of their good fireproofing effect on plastics and textiles. Therefore, a large part of waste electronic appliances are made of brominated flame retardant plastics, whether this kind of plastic can be recycled safely has become one of the environmental protection focuses. Brominated flame retardant plastics can be recycled in the following ways: 1. Landfill; 2. mechanical recovery; 3. incineration without energy recovery; 4. incineration to recover energy; 5. burn or cleave to recover bromine or hydrobromic acid. Several processes can be used to recover bromine or hydrobromic acid from bromine flame retardant plastics: 1. Incinerate with municipal solid waste method; 2. Pyrolysis/gasify; 3. Copper smelting method. With the development of copper smelting technology and equipment, the coordinated disposal of brominated flame-retardant plastics by copper smelting has become the direction of development. The organic matter containing brominated flame retardants is incinerated or co-smelted, which will produce a large amount of brominated ash, the main component of which is sodium bromide. Sodium bromide is an important bromine salt, mainly used in photographic film, medicine (sedatives), pesticides, spices, dyes and other industries. At the same time, sodium bromide dissolved in water low toxicity, irritant, belongs to dangerous goods. Therefore, the brominated materials in smelting ash have high resources and certain environmental risks, which must be recovered reasonably.

Due to the presence of cuprous bromide and other substances in bromine smelting ash, the separation of bromine is hindered. Zhang Yi of Chinese academy of sciences institute of process engineering, proposed a high concentration electrolyte solution between molten salt and conventional electrolyte by studying the comparison between conventional electrolyte solution and the molten salt medium in fluid mechanics, thermodynamics, chemical kinetics of these aspects in common and differences, for the first time, the technology of secondary molten salt recovery is proposed for vanadium extraction from vanadium slag. This kind of high concentration alkali metal ionizing medium solution can provide negative oxygen ions with high chemical activity and high activity, which is called submolten salt unconventional medium. The medium has good physicochemical properties such as high fluidity, low boiling point, high OH-activity coefficient, high chemical reactivity and adjustable separation function, etc. Based on the superior characteristics mentioned above, 100% leaching rate can be achieved, and there is no pollution emission.

SUMMARY

The purpose of the invention is mainly to realize efficient separation and recovery of bromine salt in bromine-containing smelting ash, and efficient conversion and separation of lead and zinc.

A method of recovering bromide from bromine-containing smelting ash comprising:
(1) Leaching by sub-molten salt method: smelting ash containing bromine and sodium hydroxide are leached by sub-molten salt method in the sodium hydroxide system, the solid-to-liquid ratio of smelting ash containing bromine:sodium hydroxide system is 1:2~1:40 Kg/L, sodium hydroxide system is a sodium hydroxide solution with a mass concentration of 25~45%, the leaching temperature was 140~200° C. and the leaching time was 2~4 hours, leaching liquid and residue are obtained;
(2) Washing: wash the leaching residue obtained in step (1), the solid-to-liquid ratio of leaching residue:water is 1:5~1:10 Kg/L, water is at room temperature, washing liquid and washing residue are obtained, washing residue is centralized treated;
(3) Separation of lead and zinc: Merge the leaching liquid obtained in step (1) with the washing liquid obtained in step (2) to obtain the mixture, the volume ratio of leaching liquid:washing liquid is 1:3~3:1, add 98% industrial concentrated sulfuric acid to the mixture until the pH of the mixture reaches 6.5~8, lead-zinc separation residue and lead-zinc separation liquid are obtained;
(4) Membrane separation concentration: lead-zinc separation liquid obtained in step (3) is separated and concentrated by reverse osmosis membrane to concentrated solution and water, water is returned to the washing process;
(5) Evaporation crystallization of bromine salt: concentrated solution obtained in step (4) is evaporated and crystallized to obtain crude bromine salt;
(6) Lead separation: lead-zinc separation residue obtained in step (3) is mixed with water, the solid-to-liquid ratio of lead-zinc separation residue:water is 1:1~1:2 Kg/L, stir and add 98% concentrated industrial sulfuric acid until the solution pH reaches 4.5~6, and filter to get lead sulfate and lead separation solution;
(7) Evaporative crystallization of zinc: crude zinc sulfate is obtained by evaporation and crystallization of lead separation solution obtained in step (6);

Compared with the traditional baking and recycling process of ash, the invention adopts sodium hydroxide submolten salt leaching technology, which reduces the reaction temperature by 400~500° C. and has a good energy saving effect, meanwhile, the invention also adopts membrane separation and concentration technology to efficiently concentrate the obtained lead and zinc separation liquid and reduce the energy consumption of subsequent bromine salt evaporation and crystallization, the obtained water is returned to the washing process to avoid the generation of tail fluid and realize recycling.

APPENDED DRAWINGS

FIG. 1: flow chart of a method of recovering bromide from bromine-containing smelting ash

BRIEF DESCRIPTION OF THE PREFERRED EMBODIMENT

Embodiment 1

Follow these steps:
(1) Leaching by sub-molten salt method: smelting ash containing bromine and sodium hydroxide are leached by sub-molten salt method in the sodium hydroxide system, the solid-to-liquid ratio of smelting ash containing bromine:sodium hydroxide system is 1:20 Kg/L, sodium hydroxide system is a sodium hydroxide solution with a mass concentration of 25%, the leaching temperature is 140° C. and the leaching time is 2 hours, leaching liquid and residue are obtained;
(2) Washing: wash the leaching residue obtained in step (1), the solid-to-liquid ratio of leaching residue:water is 1:5 Kg/L, water is at room temperature, washing liquid and washing residue are obtained, washing residue is centralized treated;
(3) Separation of lead and zinc: Merge the leaching liquid obtained in step (1) with the washing liquid obtained in step (2) to obtain the mixture, the volume ratio of leaching liquid:washing liquid is 1:3, add 98% industrial concentrated sulfuric acid to the mixture until the pH of the mixture reaches 6.5, lead-zinc separation residue and lead-zinc separation liquid are obtained;
(4) Membrane separation concentration: lead-zinc separation liquid obtained in step (3) is separated and concentrated by reverse osmosis membrane to concentrated solution and water, water is returned to the washing process;
(5) Evaporation crystallization of bromine salt: concentrated solution obtained in step (4) is evaporated and crystallized to obtain crude bromine salt;
(6) Lead separation: lead-zinc separation residue obtained in step (3) is mixed with water, the solid-to-liquid ratio of lead-zinc separation residue:water is 1:1 Kg/L, stir and add 98% concentrated industrial sulfuric acid until the solution pH reaches 4.5, and filter to get lead sulfate and lead separation solution;
(7) Evaporative crystallization of zinc: crude zinc sulfate is obtained by evaporation and crystallization of lead separation solution obtained in step (6);
The recovery rate of bromine, lead and zinc are 97.3%, 94.1% and 95.8% respectively.

Embodiment 2

Follow these steps:
(1) Leaching by sub-molten salt method: smelting ash containing bromine and sodium hydroxide are leached by sub-molten salt method in the sodium hydroxide system, the solid-to-liquid ratio of smelting ash containing bromine:sodium hydroxide system is 1:40 Kg/L, sodium hydroxide system is a sodium hydroxide solution with a mass concentration of 45%, the leaching temperature is 200° C. and the leaching time is 4 hours, leaching liquid and residue are obtained;
(2) Washing: wash the leaching residue obtained in step (1), the solid-to-liquid ratio of leaching residue:water is 1:10 Kg/L, water is at room temperature, washing liquid and washing residue are obtained, washing residue is centralized treated;
(3) Separation of lead and zinc: Merge the leaching liquid obtained in step (1) with the washing liquid obtained in step (2) to obtain the mixture, the volume ratio of leaching liquid:washing liquid is 3:1, add 98% industrial concentrated sulfuric acid to the mixture until the pH of the mixture reaches 8, lead-zinc separation residue and lead-zinc separation liquid are obtained;
(4) Membrane separation concentration: lead-zinc separation liquid obtained in step (3) is separated and concentrated by reverse osmosis membrane to concentrated solution and water, water is returned to the washing process;
(5) Evaporation crystallization of bromine salt: concentrated solution obtained in step (4) is evaporated and crystallized to obtain crude bromine salt;
(6) Lead separation: lead-zinc separation residue obtained in step (3) is mixed with water, the solid-to-liquid ratio of lead-zinc separation residue:water is 1:2 Kg/L, stir and add 98% concentrated industrial sulfuric acid until the solution pH reaches 6, and filter to get lead sulfate and lead separation solution;
(7) Evaporative crystallization of zinc: crude zinc sulfate is obtained by evaporation and crystallization of lead separation solution obtained in step (6);
The recovery rate of bromine, lead and zinc are 96.3%, 97.2% and 98.3% respectively.

Embodiment 3

Follow these steps:
(1) Leaching by sub-molten salt method: smelting ash containing bromine and sodium hydroxide are leached by sub-molten salt method in the sodium hydroxide system, the solid-to-liquid ratio of smelting ash containing bromine:sodium hydroxide system is 1:30 Kg/L, sodium hydroxide system is a sodium hydroxide solution with a mass concentration of 35%, the leaching temperature is 180° C. and the leaching time is 3 hours, leaching liquid and residue are obtained;
(2) Washing: wash the leaching residue obtained in step (1), the solid-to-liquid ratio of leaching residue:water is 1:7 Kg/L, water is at room temperature, washing liquid and washing residue are obtained, washing residue is centralized treated;
(3) Separation of lead and zinc: Merge the leaching liquid obtained in step (1) with the washing liquid obtained in step (2) to obtain the mixture, the volume ratio of leaching liquid:washing liquid is 1:1, add 98% industrial concentrated sulfuric acid to the mixture until the pH of the mixture reaches 7, lead-zinc separation residue and lead-zinc separation liquid are obtained;
(4) Membrane separation concentration: lead-zinc separation liquid obtained in step (3) is separated and concentrated by reverse osmosis membrane to concentrated solution and water, water is returned to the washing process;
(5) Evaporation crystallization of bromine salt: concentrated solution obtained in step (4) is evaporated and crystallized to obtain crude bromine salt;
(6) Lead separation: lead-zinc separation residue obtained in step (3) is mixed with water, the solid-to-liquid ratio of lead-zinc separation residue:water is 1:1.5 Kg/L, stir and add 98% concentrated industrial sulfuric acid until the solution pH reaches 5, and filter to get lead sulfate and lead separation solution;

(7) Evaporative crystallization of zinc: crude zinc sulfate is obtained by evaporation and crystallization of lead separation solution obtained in step (6);

The recovery rate of bromine, lead and zinc are 99.3%, 98.5% and 97.2% respectively.

Embodiment 4

Follow these steps:
(1) Leaching by sub-molten salt method: smelting ash containing bromine and sodium hydroxide are leached by sub-molten salt method in the sodium hydroxide system, the solid-to-liquid ratio of smelting ash containing bromine:sodium hydroxide system is 1:20 Kg/L, sodium hydroxide system is a sodium hydroxide solution with a mass concentration of 45%, the leaching temperature is 140° C. and the leaching time is 4 hours, leaching liquid and residue are obtained;

(2) Washing: wash the leaching residue obtained in step (1), the solid-to-liquid ratio of leaching residue:water is 1:5 Kg/L, water is at room temperature, washing liquid and washing residue are obtained, washing residue is centralized treated;

(3) Separation of lead and zinc: Merge the leaching liquid obtained in step (1) with the washing liquid obtained in step (2) to obtain the mixture, the volume ratio of leaching liquid:washing liquid is 3:1, add 98% industrial concentrated sulfuric acid to the mixture until the pH of the mixture reaches 6.5, lead-zinc separation residue and lead-zinc separation liquid are obtained;

(4) Membrane separation concentration: lead-zinc separation liquid obtained in step (3) is separated and concentrated by reverse osmosis membrane to concentrated solution and water, water is returned to the washing process;

(5) Evaporation crystallization of bromine salt: concentrated solution obtained in step (4) is evaporated and crystallized to obtain crude bromine salt;

(6) Lead separation: lead-zinc separation residue obtained in step (3) is mixed with water, the solid-to-liquid ratio of lead-zinc separation residue:water is 1:2 Kg/L, stir and add 98% concentrated industrial sulfuric acid until the solution pH reaches 4.5, and filter to get lead sulfate and lead separation solution;

(7) Evaporative crystallization of zinc: crude zinc sulfate is obtained by evaporation and crystallization of lead separation solution obtained in step (6);

The recovery rate of bromine, lead and zinc are 96.2%, 97.1% and 97.3% respectively.

Embodiment 5

Follow these steps:
(1) Leaching by sub-molten salt method: smelting ash containing bromine and sodium hydroxide are leached by sub-molten salt method in the sodium hydroxide system, the solid-to-liquid ratio of smelting ash containing bromine:sodium hydroxide system is 1:40 Kg/L, sodium hydroxide system is a sodium hydroxide solution with a mass concentration of 25%, the leaching temperature is 200° C. and the leaching time is 2 hours, leaching liquid and residue are obtained;

(2) Washing: wash the leaching residue obtained in step (1), the solid-to-liquid ratio of leaching residue:water is 1:10 Kg/L, water is at room temperature, washing liquid and washing residue are obtained, washing residue is centralized treated;

(3) Separation of lead and zinc: Merge the leaching liquid obtained in step (1) with the washing liquid obtained in step (2) to obtain the mixture, the volume ratio of leaching liquid:washing liquid is 1:3, add 98% industrial concentrated sulfuric acid to the mixture until the pH of the mixture reaches 8, lead-zinc separation residue and lead-zinc separation liquid are obtained;

(4) Membrane separation concentration: lead-zinc separation liquid obtained in step (3) is separated and concentrated by reverse osmosis membrane to concentrated solution and water, water is returned to the washing process;

(5) Evaporation crystallization of bromine salt: concentrated solution obtained in step (4) is evaporated and crystallized to obtain crude bromine salt;

(6) Lead separation: lead-zinc separation residue obtained in step (3) is mixed with water, the solid-to-liquid ratio of lead-zinc separation residue:water is 1:1 Kg/L, stir and add 98% concentrated industrial sulfuric acid until the solution pH reaches 6, and filter to get lead sulfate and lead separation solution;

(7) Evaporative crystallization of zinc: crude zinc sulfate is obtained by evaporation and crystallization of lead separation solution obtained in step (6);

The recovery rate of bromine, lead and zinc are 97.3%, 98.1% and 95.2% respectively.

Embodiment 6

Follow these steps:
(1) Leaching by sub-molten salt method: smelting ash containing bromine and sodium hydroxide are leached by sub-molten salt method in the sodium hydroxide system, the solid-to-liquid ratio of smelting ash containing bromine:sodium hydroxide system is 1:35 Kg/L, sodium hydroxide system is a sodium hydroxide solution with a mass concentration of 30%, the leaching temperature is 160° C. and the leaching time is 2.5 hours, leaching liquid and residue are obtained;

(2) Washing: wash the leaching residue obtained in step (1), the solid-to-liquid ratio of leaching residue:water is 1:8 Kg/L, water is at room temperature, washing liquid and washing residue are obtained, washing residue is centralized treated;

(3) Separation of lead and zinc: Merge the leaching liquid obtained in step (1) with the washing liquid obtained in step (2) to obtain the mixture, the volume ratio of leaching liquid:washing liquid is 1:2, add 98% industrial concentrated sulfuric acid to the mixture until the pH of the mixture reaches 7.5, lead-zinc separation residue and lead-zinc separation liquid are obtained;

(4) Membrane separation concentration: lead-zinc separation liquid obtained in step (3) is separated and concentrated by reverse osmosis membrane to concentrated solution and water, water is returned to the washing process;

(5) Evaporation crystallization of bromine salt: concentrated solution obtained in step (4) is evaporated and crystallized to obtain crude bromine salt;

(6) Lead separation: lead-zinc separation residue obtained in step (3) is mixed with water, the solid-to-liquid ratio of lead-zinc separation residue:water is 1:1.2 Kg/L, stir and add 98% concentrated industrial sulfuric acid until the solution pH reaches 5.5, and filter to get lead sulfate and lead separation solution;

(7) Evaporative crystallization of zinc: crude zinc sulfate is obtained by evaporation and crystallization of lead separation solution obtained in step (6);

The recovery rate of bromine, lead and zinc are 96.3%, 95.8% and 98.1% respectively.

What is claimed is:

1. A method of recovering bromide from bromine-containing smelting ash comprising:
   (1) smelting ash containing bromine and sodium hydroxide is leached in a sodium hydroxide solution with a mass concentration of 25 to 45%, leaching liquid and residue are obtained;
   (2) wash the leaching residue obtained in step (1) with water, a solid-to-liquid ratio of leaching residue:water is 1:5 to 1:10 Kg/L, water is at room temperature, washing liquid and washing residue are obtained, the washing residue is collected and treated;
   (3) merge the leaching liquid obtained in step (1) with the washing liquid obtained in step (2) to obtain a mixture, a volume ratio of leaching liquid: washing liquid is 1:3 to 3:1, add 98% industrial concentrated sulfuric acid to the mixture until the pH of the mixture reaches 6.5~8, lead-zinc separation residue and lead-zinc separation liquid are obtained;
   (4) the lead-zinc separation liquid is separated and concentrated by reverse osmosis membrane to obtain concentrated solution and water, the water is returned to step (2);
   (5) the concentrated solution is evaporated and crystallized to obtain crude bromine salt;
   (6) the lead-zinc separation residue is mixed with water, a solid-to-liquid ratio of lead-zinc separation residue: water is 1:1 to 1:2 Kg/L, stir and add 98% concentrated industrial sulfuric acid until pH thereof reaches 4.5 to 6, and filter to obtain lead sulfate and lead separation solution;
   (7) crude zinc sulfate is obtained by evaporation and crystallization of the lead separation solution.

2. The method of recovering bromide from bromine-containing smelting ash of claim 1, wherein,
   in step (1), a solid-to-liquid ratio of smelting ash containing bromine:sodium hydroxide system is 1:20 to 1:40 Kg/L, a leaching temperature is 140 to 200° C. and leaching time is 2 to 4 hours.

* * * * *